(12) United States Patent
Mueller et al.

(10) Patent No.: US 7,556,207 B2
(45) Date of Patent: Jul. 7, 2009

(54) THERMOSTAT WITH TOUCH MEMBRANE FEATURE

(75) Inventors: Carl J. Mueller, St. Louis, MO (US);
John M. Sartain, St. Louis, MO (US);
Jeff Edgar, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 605 days.

(21) Appl. No.: 11/197,391

(22) Filed: Aug. 4, 2005

(65) Prior Publication Data
US 2007/0029397 A1    Feb. 8, 2007

(51) Int. Cl.
G05D 23/00      (2006.01)
(52) U.S. Cl. .......................................... 236/94
(58) Field of Classification Search ................... 236/51, 236/91 R, 91 D, 91 E, 94
See application file for complete search history.

(56) References Cited
U.S. PATENT DOCUMENTS

| | | | |
|---|---|---|---|
| 6,824,069 B2 | 11/2004 | Rosen | 236/94 |
| 7,232,075 B1 * | 6/2007 | Rosen | 236/51 |
| 7,274,972 B2 * | 9/2007 | Amundson et al. | 700/276 |
| 2004/0245352 A1 * | 12/2004 | Smith | 236/94 |
| 2005/0050478 A1 * | 3/2005 | Beierwaltes et al. | 715/968 |

* cited by examiner

Primary Examiner—Marc E Norman
(74) Attorney, Agent, or Firm—Harness, Dickey & Pierce, P.L.C.

(57) ABSTRACT

A thermostat is provided that comprises a touch-sensitive transparent membrane adapted to be affixed over a display, where the transparent membrane has a plurality of membrane switches. The thermostat comprises a microprocessor in communication with the plurality of membrane switches, and has a memory for storing a program for controlling the operation of the climate control system. The thermostat further comprises a display device responsive to the microprocessor for displaying a first screen having at least a first user-interface icon associated with at least one membrane switch, where in response to the user touching the membrane switch associated with the first user-interface icon the display device displays a second screen having at least a run user-interface icon and a schedule user-interface icon.

21 Claims, 11 Drawing Sheets

THERMOSTAT WITH TOUCH MEMBRANE FEATURE

FIELD OF THE INVENTION

The present invention relates generally to thermostats for controlling climate control systems, and more particularly to touch-screen thermostats having multiple screens displaying several functional icons.

BACKGROUND OF THE INVENTION

Some digital programmable thermostats include display screens that are limited in size by the necessary inclusion of buttons on the front of the thermostat. A thermostat having a touch screen display enables the display size to be increased, as a result of incorporating the buttons into the display device. A touch screen thermostat can also allow for displaying more information and providing more buttons for user input for operating the thermostat. However, the typical touch screen thermostat includes numerous different icons that the user must analyze to determine the necessary series of different icons that must be pressed to program the thermostat. If the user is faced with a thermostat having a confusing series of different icons to progress through, the user is not likely to realize any energy savings due to the user's apprehension towards programming the thermostat.

SUMMARY OF THE INVENTION

Various embodiments of a programmable touch-screen thermostat for controlling a climate control system are disclosed that comprises a simple, convenient programming feature. According to one aspect of programming the thermostat, one embodiment comprises a touch-sensitive transparent membrane adapted to be affixed over a display, where the transparent membrane has a plurality of membrane switches. The thermostat comprises a microprocessor in communication with the plurality of membrane switches, and has a memory for storing a program for controlling the operation of the climate control system. The thermostat further comprises a display device responsive to the microprocessor for displaying a first screen having at least a first user-interface icon associated with at least one membrane switch, where in response to the user touching the membrane switch associated with the first user-interface icon the display device displays a second screen having at least a run user-interface icon and a schedule user-interface icon. In response to the user touching the schedule user-interface icon, the display device displays a third screen having a time forward icon, a time backward icon, a temperature-up icon, and a temperature-down icon, whereby a user may touch the time forward icon, time backward icon, temperature-up icon, and temperature-down icon to adjust the desired temperature and start time for each of a plurality of schedule periods by which the program operates to control the climate control system.

In another aspect, other embodiments of a thermostat are provided that comprise a touch-sensitive transparent membrane adapted to be affixed over a display device and having a plurality of membrane switches, and a microprocessor in communication with the plurality of membrane switches. The thermostat further comprises a display device responsive to the microprocessor for displaying at least a first screen having at least a first user interface icon associated with a first membrane switch, where in response to the user touching the first membrane switch associated with the first user interface icon the display device displays a second screen having at least a schedule user interface icon associated with the first membrane switch. The user may then touch the first membrane switch associated with the schedule icon to display a third screen for enabling adjustment of the schedule by which the thermostat functions. In response to the user touching the first membrane switch associated with the schedule icon, the display device displays a third screen having at least a time forward icon, a time backward icon, a temperature up icon, and a temperature down icon. The user may touch the time forward icon, time backward icon, temperature up icon, and temperature down icon to adjust the desired temperature setting and start time for each of a plurality of schedule periods by which the program functions to control operation of the climate control system to maintain a desired temperature.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate corresponding parts throughout the several views of the drawings.

DETAILED DESCRIPTION OF THE EMBODIMENTS

The following description of the various embodiments are merely exemplary in nature and are in no way intended to limit the invention, its application, or uses.

Figure 1:
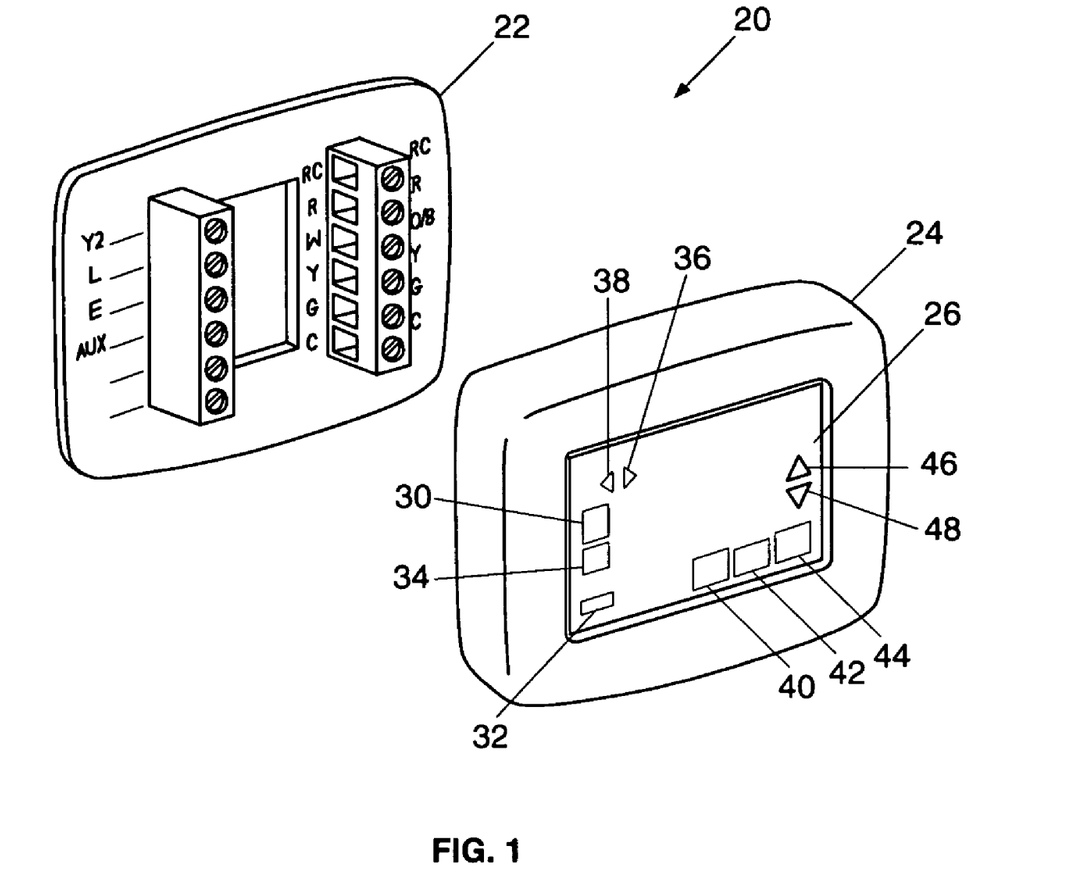
FIG. 1 is a perspective view of one embodiment, shown disassembled, of a thermostat in accordance with the present invention.

One embodiment of a thermostat 20 according to the principles of the present invention is shown in FIG. 1. The thermostat 20 comprises a sub-base portion 22 having a plurality of connectors for connection to a climate control system, and a thermostat display portion 24 adapted to connect to the sub-base portion 22. The thermostat display portion 24 preferably comprises a display device 26 capable of displaying a plurality of screens having user-interactive icons for directing user input selections to the thermostat 20.

In the first embodiment, a thermostat is provided that comprises a touch-sensitive transparent membrane (not shown due to the transparent nature of the membrane), which is adapted to be affixed over a display device 26. The transparent membrane has a plurality of membrane switches 30-48 defining areas as shown in FIG. 1, which are arranged across the surface of the display device 26. The display device 26 is preferably an LCD display of a size of at least 2.5 inches by 3.5 inches, and is in communication with the microprocessor of the thermostat. Referring to FIGS. 2-9, the display device 26 is capable of displaying a plurality of user interface icons 50-72 in locations that correspond to the plurality of membrane switches 28-46, such that a displayed user interface icon is associated with a given individual membrane switch. Thus, the display device 26 is responsive to the microprocessor to display at least one user interface icon, of which has an associated membrane switch that is in communication with the microprocessor. Accordingly, the microprocessor is capable of detecting when a user has touched or pressed a membrane switch area associated with a displayed icon, for the purpose of enabling user selection or input of programming information.

Figure 2:
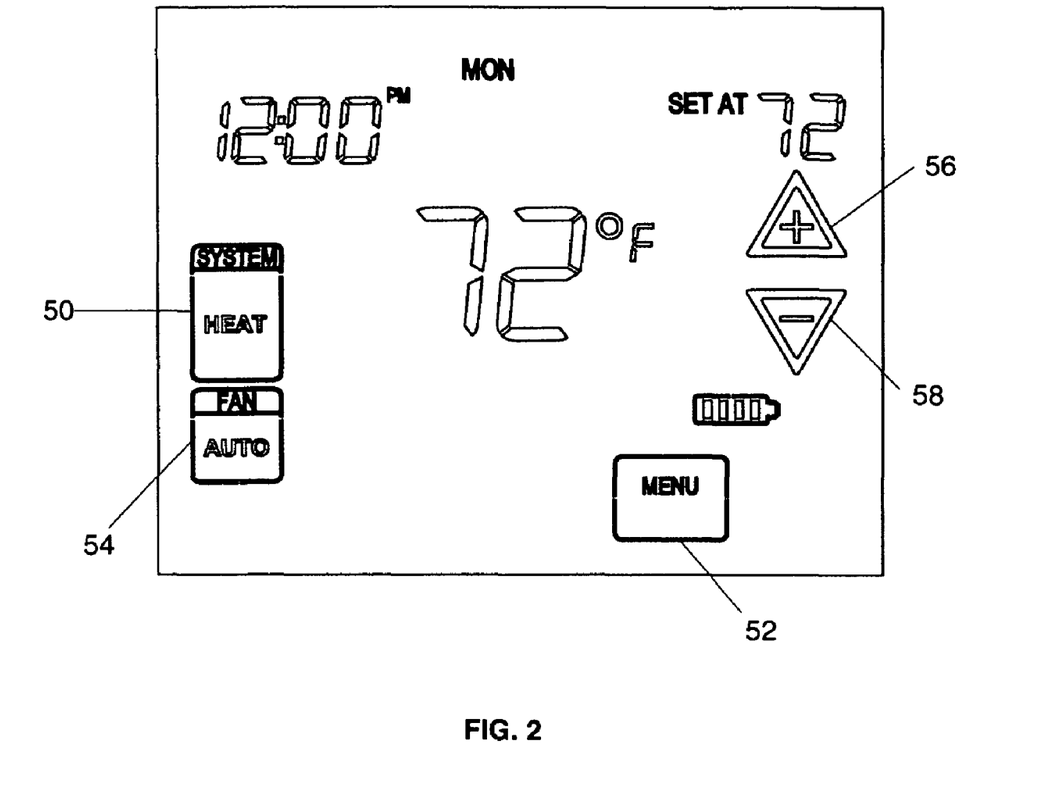
FIG. 2 is an illustration of a display image of one embodiment of a thermostat.

The thermostat comprises a microprocessor in communication with the plurality of membrane switches 30-48. The microprocessor preferably includes a memory for storing a program for controlling the operation of a climate control system. The first embodiment comprises a display device 26 responsive to the microprocessor for displaying at least a first screen 26A as shown in FIG. 2. The first screen 26A displayed after installation of the thermostat 20 comprises at least a first user interface icon 52, and may further comprise other icons such as an "up" icon 56, a "down" icon 58, a "system" icon 50 and a "fan" icon 54. At any time, the user may press the membrane switch 46 associated with the "up" icon 56 to temporarily raise the desired temperature, or press the membrane switch 48 associated with the "down" icon 58 to temporarily lower the desired temperature for the space. Such temperature changes would be held for a limited time period, after which the program would revert to the scheduled temperature. It should be noted that the "up" icon 56 and "down" icon 58 may be, for example, arrows that are displayed by the display device. Alternatively, the arrows may be painted or printed on the transparent membrane switch 48, such that the "up" and "down" temperature icons are permanently visible. The "up" icon may further be comprised of a red colored arrow, and the "down" icon may further be comprises of a blue colored arrow. Likewise, the display may be a color LCD display that is capable of displaying a red "up" icon and a blue "down" icon on the display. Where a color LCD display is utilized, the user is optionally provided with a selectable color for the display background, the text and the backlight for the display.

Where a "system" icon 50 is provided, the user may press a membrane switch 30 associated with the system icon 50 to switch the thermostat setting between a heat mode, cool mode, automatic switchover mode, or an off mode. Alternatively, the system switch does not have to be included on the screen display 26, and could be provided as a physical button or manual switch off of the LCD display. Where a "fan" icon 54 is provided, the user may press a membrane switch 34 associated with the "fan" icon 54 to switch the fan operation between an automatic mode or a continuously on mode. Alternatively, the fan switch does not have to be included on the screen display 26, and could be provided as a physical button or manual switch off of the LCD display.

The first screen 26A has at least a first user-interface icon 52 associated with at least one membrane switch 42, where in response to the user touching the membrane switch 42 associated with the first user-interface icon 52 the display device 26 displays a second screen 26B. The first user interface icon 52 is preferably labeled menu, and accordingly invokes a second menu screen upon pressing the menu icon 52.

Figure 3:
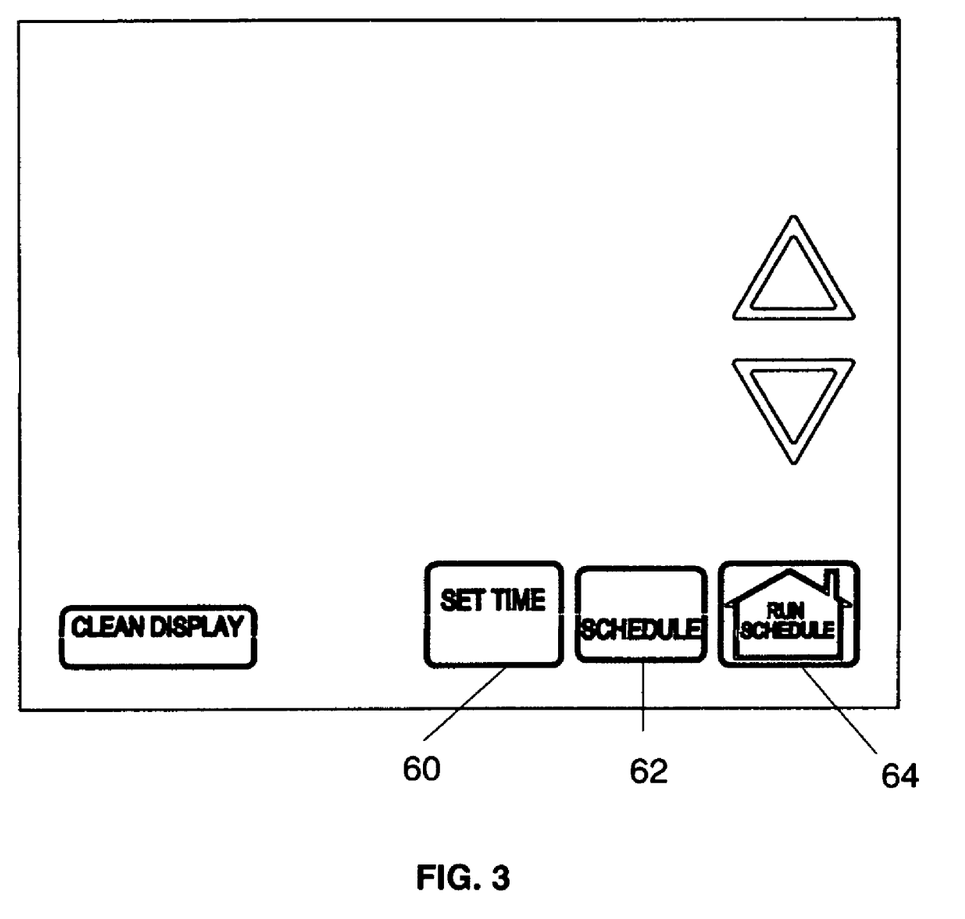
FIG. 3 is an illustration of another display image of one embodiment of a thermostat.
Figure 4:
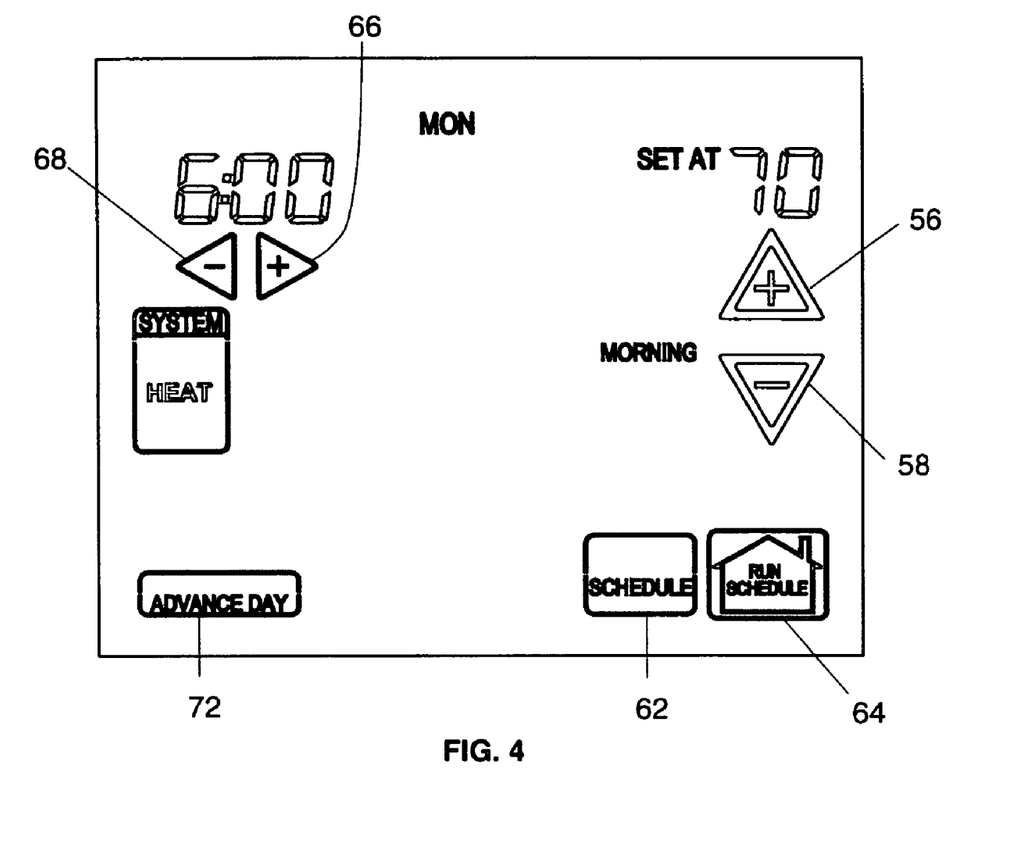
FIG. 4 is an illustration of a display image of one program schedule period in one embodiment of a thermostat.

Referring to FIG. 3, the second screen 26B has at least a run user-interface icon 64 and a schedule user-interface icon 62, whereby a user may touch or press the membrane switch 42 associated with the schedule user-interface icon 62 to enable adjustment of the schedule by which the program operates to control the climate control system. In response to the user touching the schedule user-interface icon 62, the display device 26 displays a third screen 26C as shown in FIG. 4. The schedule user-interface icon 62 is configured in a default mode to be animated, such that the outline of the user-interface icon 62 flashes on and off, or the interior space of the icon flashes bright and dark. Alternatively, the user of the thermostat may alternatively change the default animated setting such that the icon does not flash, or the thermostat may be programmed without an animated default setting.

Figure 5:
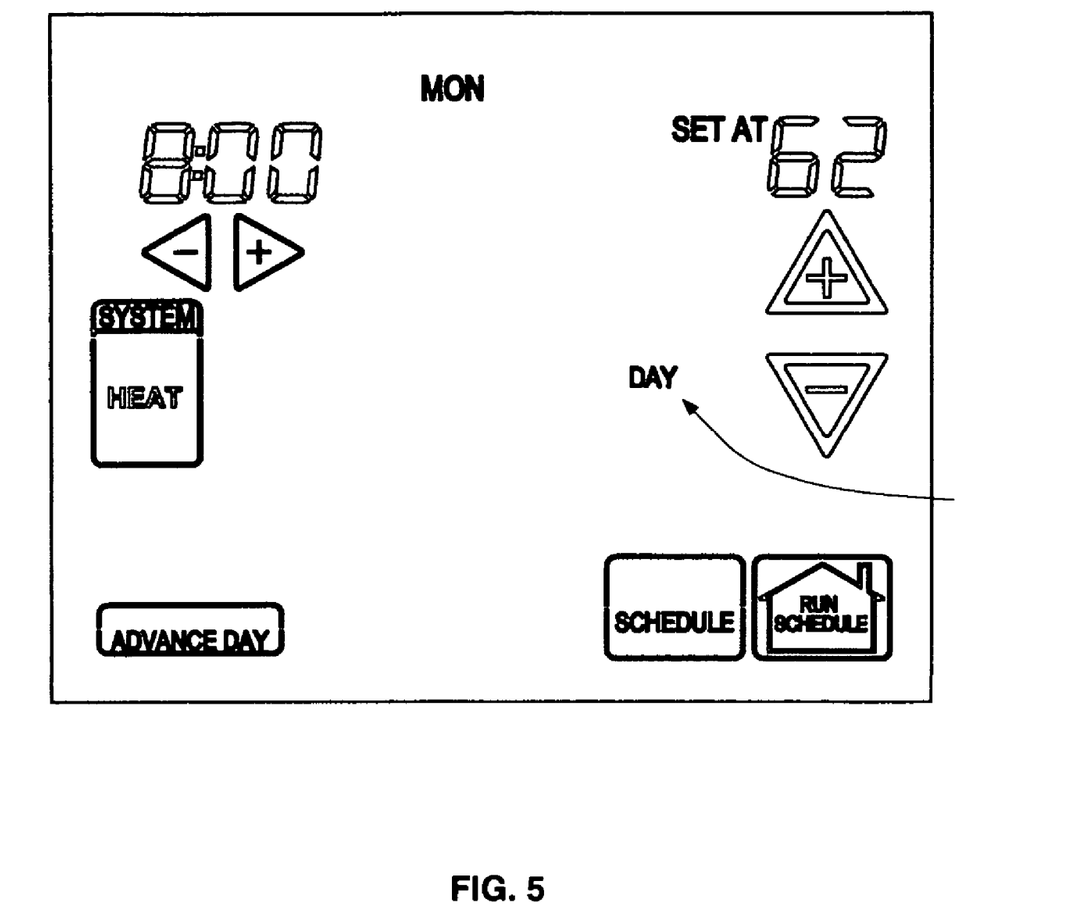
FIG. 5 is an illustration of a display image of another program schedule period in one embodiment of a thermostat.
Figure 6:
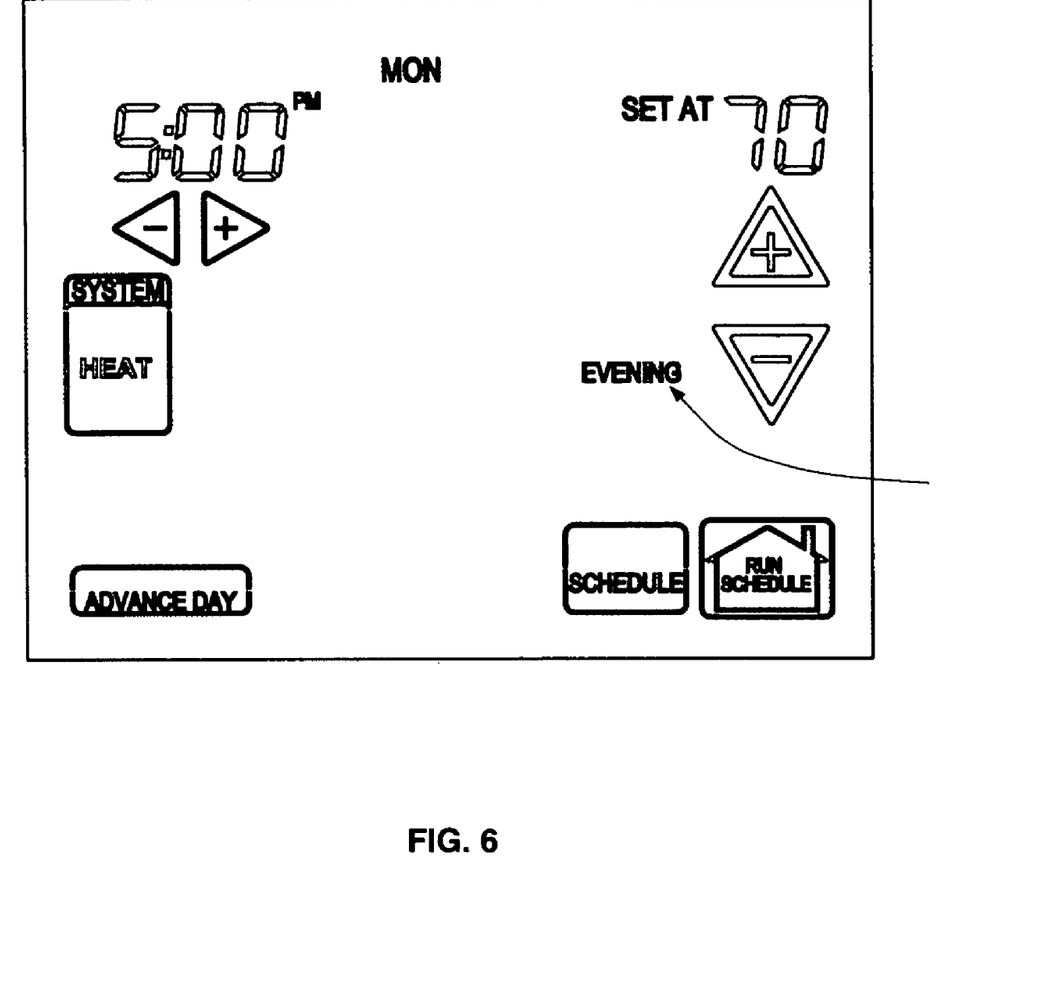
FIG. 6 is an illustration of a display image of yet another program schedule period in one embodiment of a thermostat.
Figure 7:
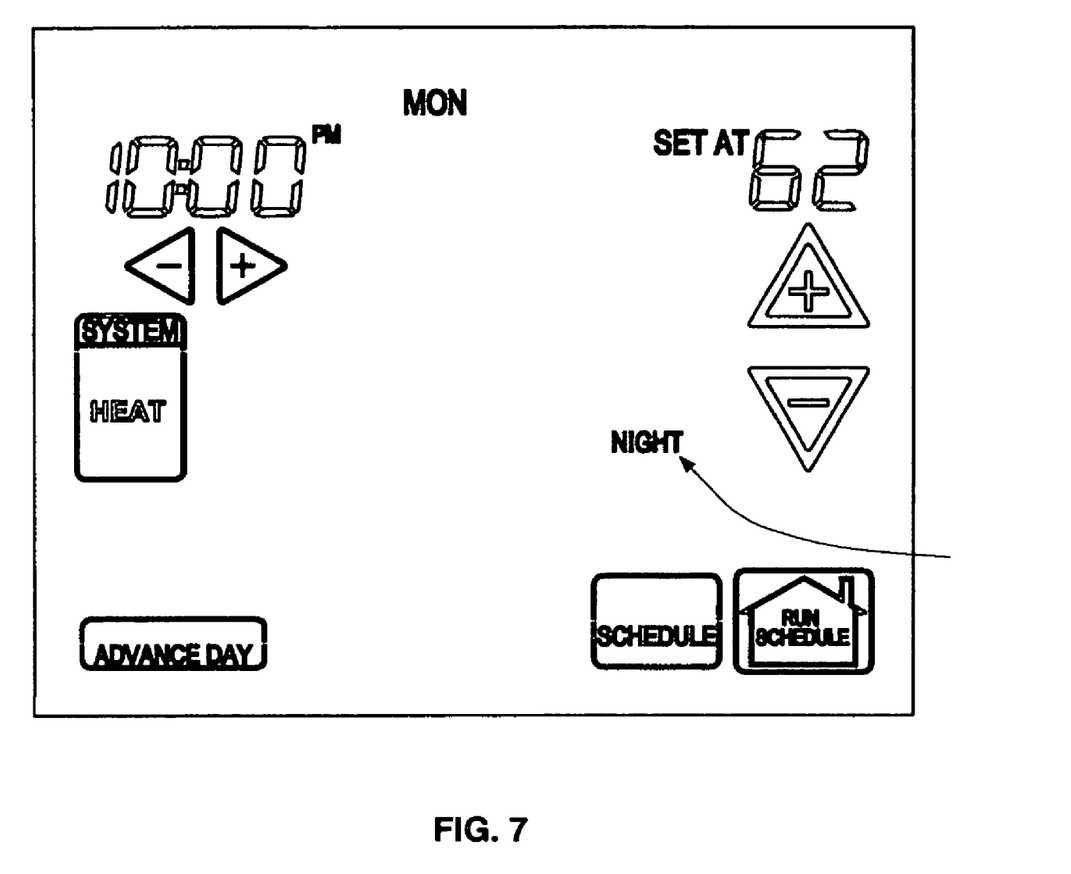
FIG. 7 is an illustration of a display image of yet another program schedule period in one embodiment of a thermostat.
Figure 8:
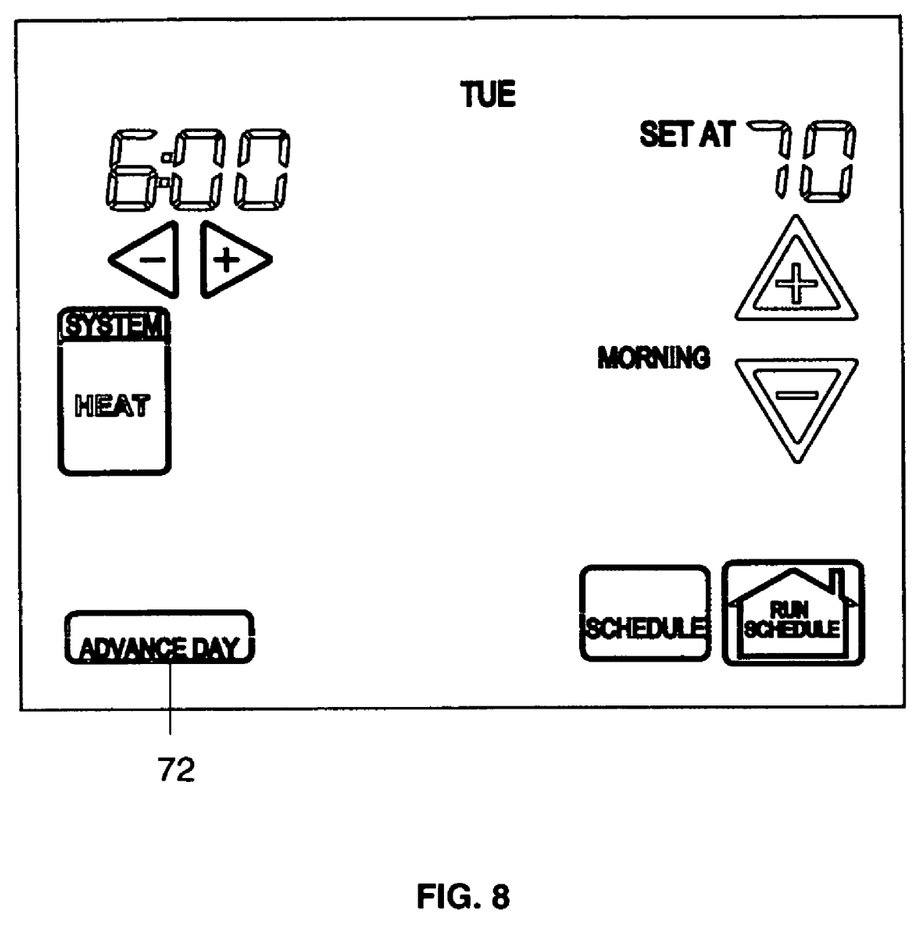
FIG. 8 is an illustration of a display image of a program schedule period for a different day.

The third screen 26C has a time forward icon 66 associated with a membrane switch 36, a time backward icon 68 associated with a membrane switch 68, a temperature-up icon 56 associated with a membrane switch 46, and a temperature-down icon 58 associated with a membrane switch 48. The user may touch the time forward icon 66, time backward icon 68, temperature-up icon 56, and temperature-down icon 58 to adjust the desired temperature and start time for each of a plurality of schedule periods by which the program operates to control the climate control system. For example, in heating mode the user may choose a desired temperature of 70 degrees Fahrenheit to begin at 6 AM as shown in FIG. 5. When the user has adjusted the start time and the desired temperature of a given time period, such as a "morning" time period as shown in FIG. 5, the user may then press the schedule user-interface icon 62 to advance the schedule to the next schedule period. The user may then choose to set back the temperature to 62 degrees Fahrenheit beginning at 8 AM, such that the heating system is less utilized to provide for energy savings. The user may continue to use the time forward icon 66, time backward icon 68, temperature-up icon 56, and temperature-down icon 58 to adjust the desired temperature and start time for the "day", "evening" and "night" periods as shown in FIGS. 6, 7 and 8. When the user has completed the schedule for the day, the user may press the advance day icon 72 to advance to the next day to be scheduled. In this manner, the user can set a start time and a desired temperature for four schedule periods per day, to program the thermostat to control climate control system operation to maintain a desired temperature. Once the user has completed setting the schedule, the user may simply press the "run schedule icon 64 to return to the first display screen 26A and run the program according to the adjusted schedule.

Figure 9:
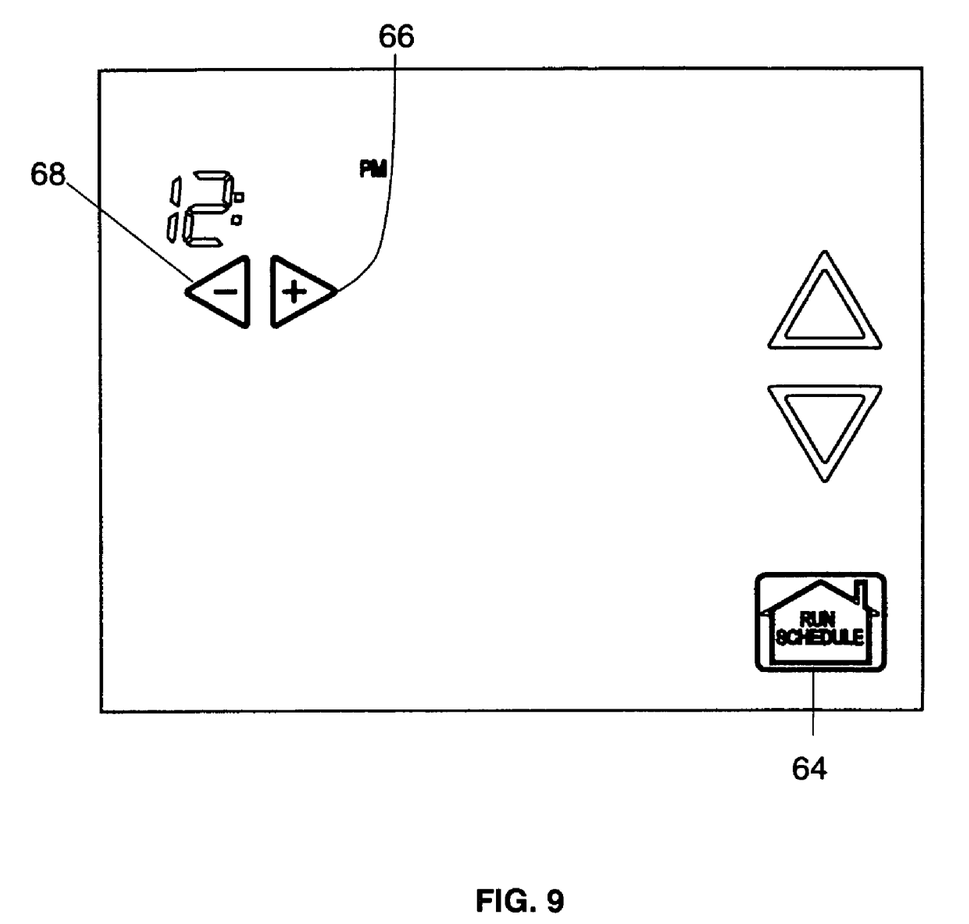
FIG. 9 is an illustration of a display image of a time set feature of one embodiment of a thermostat.
Figure 10:
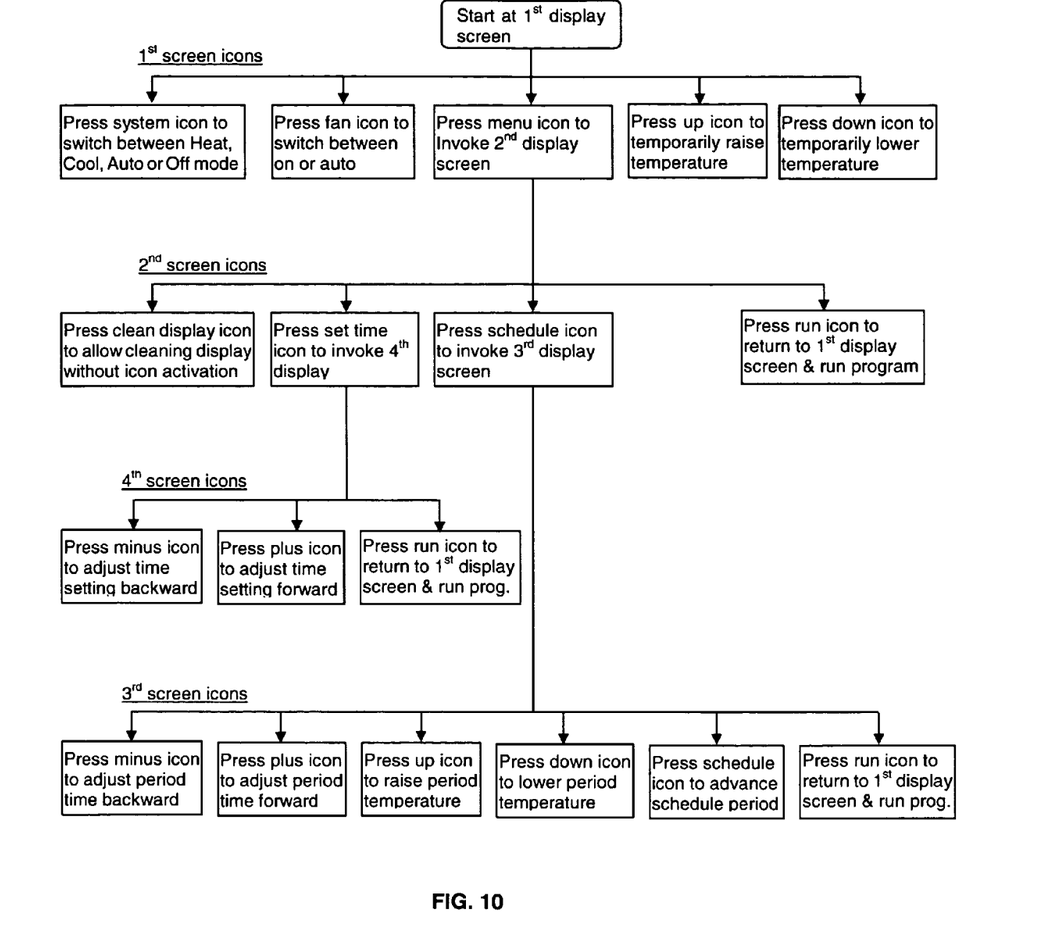
FIG. 10 is a diagram illustrating one embodiment of a thermostat having user interactive icons for selecting different screens for scheduling.

Referring to FIG. 3, the second screen 26B may further comprise a time user interface icon 60 associated with a membrane switch 40. In response to the user touching the membrane switch 40 associated with the time user-interface icon 60, the display device displays a fourth screen 26D as shown in FIG. 9. The fourth screen 26D has a time forward icon 66, a time backward icon 68, and a run icon 64. The user may touch the time forward icon 66 and the time backward icon 68 to adjust the current time setting by which the thermostat operates to control the climate control system. Once the user has completed setting the time, the user may simply press the "run schedule icon 64 to return to the first display screen 26A and run the program according to the adjusted current time.

In a second embodiment, the thermostat comprises a touch-sensitive transparent membrane having a plurality of membrane switches 30-48, defining areas as shown in FIG. 1, and a microprocessor in communication with the plurality of membrane switches, where the microprocessor has a memory for storing a program for controlling the operation of the climate control system. The transparent membrane is adapted to be affixed over a display device 26, which is responsive to the microprocessor for displaying at least a first screen 26A. The second embodiment simplifies user programming of the thermostat by successively displaying icons positioned relative to a first membrane switch, such that a user may repeatedly touch the first membrane switch area to easily invoke the thermostat's program schedule. The first screen 26A has at least a first user interface icon 52 associated with a first membrane switch 42, wherein response to the user touching the first membrane switch 42 associated with the first user interface icon 52 the display device displays a second screen 26B. The second screen 26B has at least a Schedule user interface icon 62 associated with the first membrane switch 42, whereby a user may touch the first membrane switch 42 associated with the Schedule icon 62 to display a third screen 26C for enabling adjustment of the schedule by which the program functions. The third screen 26C has at least a time forward icon 66, a time backward icon 68, a temperature up icon 56, and a temperature down icon 58, whereby a user may touch the time forward icon, time backward icon, temperature up icon, and temperature down icon to adjust the desired temperature setting and start time for each of a plurality of schedule periods by which the program functions to control operation of the climate control system. The user may alter the start time or temperature setting of the first schedule period, or may continue to press the schedule icon 62 to advance to successive schedule periods. Thus, the user of the second embodiment may repeated press a single membrane switch 42 associated with both the menu icon 52 and the schedule icon 62, to advance from the default first screen 26A to the second screen 26B and to the third screen 26C for adjusting the program schedule of the thermostat. The user may continue to press the single membrane switch 42 to advance to the desired schedule period that the user desires to adjust. Thus, the user does not have to analyze each screen display to determine where the next icon to be pressed is located, because the menu icon 52 and schedule icon 62 are positioned relative to the same membrane switch 42 to allow the user to repeatedly press the same membrane switch 42 to quickly reach the schedule period the user desires to change.

In the second embodiment, the third screen 26C further comprises a run user interface icon 64 associated with a second membrane switch 44, where in response to the user touching the second membrane switch 44 associated with the run user interface icon 64, the display device displays the first screen 26A and the program functions to control the operation of the climate control system based on the times and temperatures for the plurality of schedule periods.

The second screen may also comprise a time user interface icon 60 associated with a third membrane switch 40, where in response to the user touching the third membrane switch 40 associated with the time user interface icon 60, the display device displays a fourth screen 26D having a time forward icon 66 and a time backward icon 68 that a user may touch to adjust the current time setting by which the program functions to control the operation of the climate control system. However, the time setting may be preset at production for the time zone that the thermostat is to be shipped to for distribution. Accordingly, it is not necessary for the user of the thermostat to use this time set feature, except in those situations where the user's time zone does not correspond to the setting. Thus, the second embodiment of a thermostat allows the user to repeatedly press a single membrane switch to advance through a plurality of screens to enable adjustment of a schedule, which significantly simplifies programming of the thermostat.

Figure 11:
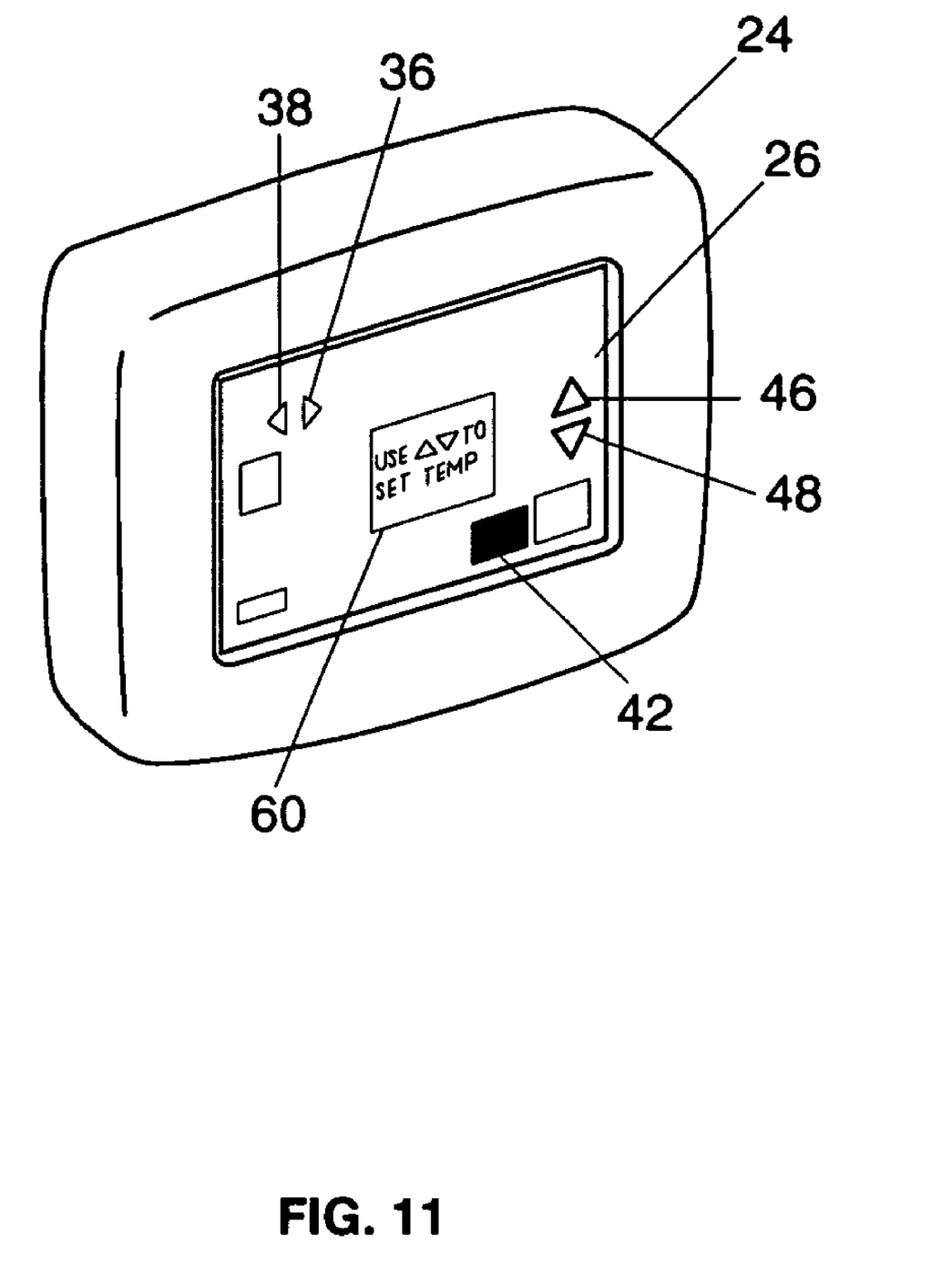

Some embodiments may further comprise a programming wizard for assisting the user with programming the thermostat, as shown in FIG. 11. For example, when a user presses the membrane switch 42 associated with the schedule icon 62, the thermostat may display the third screen 26C shown in FIG. 4 for scheduling programmed times and temperatures. The programming wizard may momentarily highlight or darken the scheduling icon 62 to display the selection the user has made, and may further display an instructional "window" 70 that provides instructions to the user as to which icons to use with the function the user has selected. Alternatively, some embodiments may flash the scheduling icon 62 on and off rather than highlight or darken the icon 62, to indicate which icon function the user has selected. As shown in FIG. 11, the instructional window 70 that provide user instructions for programming times and temperature settings aid the user in programming the thermostat, without having to refer to an instruction manual. By providing such programming instructions, the user is more likely to program the thermostat with set back temperatures to obtain energy savings through reduced system operation, as opposed to conventional programmable thermostats without such instructional information.

Various embodiments of the inventive thermostat may further provide for displaying a company name on the display device 26. The company name to be displayed may be the manufacturer's trade name or logo, as a default. The company name to be displayed may also be selectably changed, by an installer for example, to that of a distributor name or contractor name. The thermostat accordingly may provide the name and contact of a company that may provide the user with additional support regarding thermostat operation or system troubleshooting.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermostat for controlling a climate control system to maintain a desired temperature in a space, comprising:
a touch-sensitive transparent membrane adapted to be affixed over a single display device, the transparent membrane having a plurality of membrane switches, a first membrane switch of which is positioned along a bottom edge of the single display device; and
a microprocessor in communication with the plurality of membrane switches;
a single display device responsive to the microprocessor for displaying at least a first menu icon along the bottom edge of the single display device that is positioned relative to and associated with the first membrane switch positioned along the bottom edge of the single display device, wherein the single display device subsequently displays at least a run icon and a schedule icon in response to the user touching the first menu icon associated with the first membrane switch, where the schedule icon is positioned along the bottom edge of the single display device so as to be positioned relative to the first membrane switch, such that the single display device successively displays a first menu icon and a schedule icon positioned relative to the first membrane switch, whereby a user may repeatedly press only the first membrane switch associated with both the first menu icon and the schedule icon, to advance from a first screen including the first menu icon to a second screen including the schedule icon and to a third screen to enable adjustment of the schedule by which the thermostat operates to control the climate control system to maintain a desired temperature in the space.

2. The thermostat of claim 1 wherein run icon and schedule icon are each associated with individual membrane switches.

3. The thermostat of claim 2 where in response to the user touching the membrane switch associated with the schedule icon the single display device displays a time forward icon, a time backward icon, a temperature-up icon, and a temperature-down icon, whereby a user may touch the time forward icon, time backward icon, temperature up icon, and temperature down icon to adjust the temperature setting and start time for each of a plurality of schedule periods by which the thermostat operates to control the temperature in the space.

4. The thermostat of claim 3, wherein the temperature up icon and temperature down icon allows the user to adjust the desired temperature set point for each of the morning, day, evening and night schedule periods.

5. The thermostat of claim 1 where in response to the user touching the first icon associated with the at least one membrane switch, the single display device further displays a time icon associated with an individual membrane switch.

6. The thermostat of claim 5 where in response to the user touching the membrane switch associated with the time icon, the single display device displays a time forward icon and a time backward icon, whereby a user may touch the time forward icon and the time backward icon to adjust the current time setting by which the thermostat operates to control the climate control system for maintaining a desired temperature.

7. The thermostat of claim 6, wherein the time forward icon and time backward icon allow the user to adjust the start time for each of a morning, day, evening and night period, during which a desired temperature is maintained.

8. The thermostat of claim 1, where in response to touching the run icon, the single display device displays the first icon and the program operates to control the climate control system based on the times and temperatures for a plurality of schedule periods.

9. A thermostat for controlling a climate control system to maintain a desired temperature in a space, comprising:
   a touch-sensitive transparent membrane adapted to be affixed over a single display, the transparent membrane having a plurality of membrane switches, a first membrane switch of which is positioned along a bottom edge of the single display device;
   a microprocessor in communication with the touch-sensitive transparent membrane adapted to be affixed over a single display device, the transparent membrane having a plurality of membrane switches, the microprocessor having a memory for storing a program for controlling the operation of the climate control system; and
   a single display device responsive to the microprocessor for displaying a first screen having at least a first menu user-interface icon along the bottom edge of the single display device that is positioned relative to and associated with the first membrane switch positioned along the bottom edge of the single display device, where in response to the user touching the first membrane switch associated with the first menu user-interface icon the single display device displays a second screen having at least a run user-interface icon and a schedule user-interface icon, wherein the schedule icon is positioned along the bottom edge of the single display device so as to be positioned relative to the first membrane switch such that the single display device successively displays a first menu user-interface icon and a schedule user-interface icon positioned relative to the first membrane switch, whereby a user may repeatedly touch only the first membrane switch associated with both the first menu user-interface icon and the schedule user-interface icon, to advance from a first screen including the first menu user-interface icon to a second screen including the schedule user-interface icon to enable adjustment of the schedule by which the program operates to control the climate control system.

10. The thermostat of claim 9 where in response to the user touching the schedule user-interface icon, the single display device displays a third screen having a time forward icon, a time backward icon, a temperature-up icon, and a temperature-down icon, whereby a user may touch the time forward icon, time backward icon, temperature-up icon, and temperature-down icon to adjust the desired temperature and start time for each of a plurality of schedule periods by which the program operates to control the climate control system.

11. The thermostat of claim 10, wherein the time forward icon and time backward icon allow the user to adjust the start time for each of a morning, day, evening and night schedule period, during which periods a desired temperature is maintained.

12. The thermostat of claim 11, wherein the temperature-up icon and temperature-down icon allow the user to adjust a desired temperature set point for each of the morning, day, evening and night schedule periods.

13. The thermostat of claim 9 wherein run user-interface icon and schedule user-interface icon are each associated with an individual respective membrane switch.

14. The thermostat of claim 13, where in response to touching the run user-interface icon, the single display device displays the first screen and the program operates to control the climate control system based on the times and desired temperatures of each of the plurality of schedule periods.

15. The thermostat of claim 9 wherein the second screen further comprises a time user-interface icon associated with a membrane switch.

16. The thermostat of claim 15 where in response to the user touching the membrane switch associated with the time user-interface icon, the single display device displays a third screen having a time forward icon and a time backward icon, whereby a user may touch the time forward icon and the time backward icon to adjust the current time setting by which the thermostat operates to control the climate control system.

17. A thermostat for controlling a climate control system for maintaining a desired temperature in a space, comprising:
   a touch-sensitive transparent membrane adapted to be affixed over a single display device, the transparent membrane having a plurality of membrane switches, a first membrane switch of which is positioned along a bottom edge of the single display device;
   a microprocessor in communication with the plurality of membrane switches, the microprocessor having a memory for storing a program for controlling the operation of the climate control system; and
   a single display device responsive to the microprocessor for displaying at least a first screen having at least a first menu user interface icon along the bottom edge of the single display device that is positioned relative to and associated with the first membrane switch positioned along the bottom edge of the single display device, where in response to the user touching the first membrane switch associated with the first menu user interface icon the single display device displays a second screen having at least a Schedule user interface icon associated with the first membrane switch, wherein the Schedule icon is positioned along the bottom edge of the single display device so as to be positioned relative to the first membrane switch such that the single display device successively displays a first menu user-interface icon and a Schedule user-interface icon positioned relative to the first membrane switch, whereby a user may repeatedly touch the single first membrane switch associated with both the first menu user-interface icon and the Schedule user-interface icon, to advance from a first screen including the first menu user-interface icon to a second screen including the Schedule icon to enable adjustment of the schedule by which the program functions to control the operation of the climate control system to maintain a desired temperature.

18. The thermostat of claim 17 where in response to the user touching the first membrane switch associated with the schedule user interface icon, the single display device displays a third screen having at least a time forward icon, a time backward icon, a temperature up icon, and a temperature down icon, whereby a user may touch the time forward icon, time backward icon, temperature up icon, and temperature down icon to adjust the desired temperature setting and start time for each of a plurality of schedule periods by which the program functions to control operation of the climate control system to maintain a desired temperature.

19. The thermostat of claim 18 wherein the third screen further comprises a run user interface icon associated with a second membrane switch, where in response to the user touching the second membrane switch associated with the run user interface icon, the single display device displays the first screen and the program functions to control the operation of the climate control system based on the times and temperatures for the plurality of schedule periods.

20. The thermostat of claim 19 wherein the second screen further comprises a time user interface icon associated with a third membrane switch, where in response to the user touching the third membrane switch associated with the time user interface icon, the single display device displays a fourth screen having a time forward icon and a time backward icon that a user may touch to adjust the current time setting by which the program functions to control the operation of the climate control system to maintain a desired temperature.

21. The thermostat of claim 18 wherein the microprocessor is configured to cause the display device to display an instructional window that provides instructions to the user as to which of the displayed icons to use with a function that the user has selected.

\* \* \* \* \*